United States Patent [19]
Yokouchi

[11] Patent Number: 5,517,661
[45] Date of Patent: May 14, 1996

[54] SINGLE-CHIP MICRO-COMPUTER HAVING A PLURALITY OF OPERATION MODES

[75] Inventor: Hideaki Yokouchi, Nagano, Japan

[73] Assignee: Seiko Epson Corporation, Tokyo, Japan

[21] Appl. No.: 323,581

[22] Filed: Oct. 17, 1994

Related U.S. Application Data

[63] Continuation of Ser. No. 788,229, Nov. 5, 1991, abandoned.

[30] Foreign Application Priority Data

Nov. 16, 1990 [JP] Japan .................................. 2-310491

[51] Int. Cl.⁶ ...................................................... G06F 3/00
[52] U.S. Cl. ...................... 395/800; 364/933; 364/942.8; 364/949.1; 364/948.1; 364/DIG. 2
[58] Field of Search ............................................. 395/800

[56] References Cited

U.S. PATENT DOCUMENTS 4,037,094  7/1977  Van Dierendonck ................... 235/175
4,349,870  9/1982  Shaw ....................................... 395/800
4,439,839  3/1984  Kneib ...................................... 395/800
4,460,972  7/1984  Homan .................................... 395/375
4,466,055  8/1984  Kinoshita ............................... 395/800
4,491,907  1/1985  Koeppen ................................. 395/800
4,785,469  11/1988 Joshi ....................................... 375/366
5,101,498  3/1992  Ehlig ...................................... 395/800

Primary Examiner—Eric Coleman
Attorney, Agent, or Firm—Ladas & Parry

[57] ABSTRACT

Disclosed are a single-chip micro-computer optimized for an electronic memorandum book, an electronic dictionary or the like by suppressing the increase of the number of terminals, and an electronic apparatus having therein the single-chip micro-computer. The single-chip micro-computer has: a mode setting register for establishing a mode setting signal for either a first mode for outputting a memory address signal or a second mode for outputting an arithmetic operation output stored in an output register on the basis of a control signal from a micro instruction generation circuit; and a selection circuit for outputting either the memory address signal or the arithmetic operation output to address signal terminals on the basis of the mode setting signal.

9 Claims, 8 Drawing Sheets

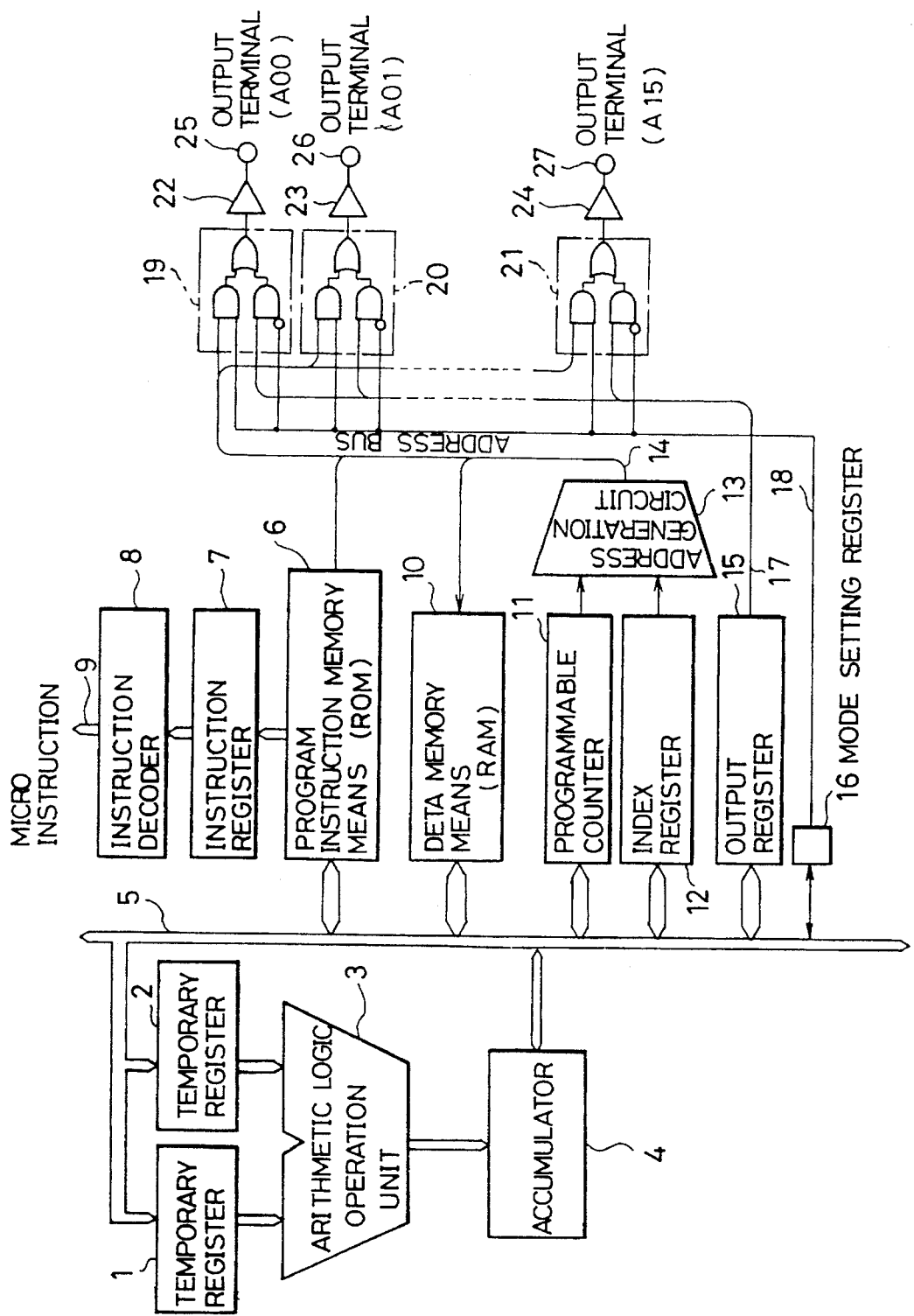
F I G. 1

SINGLE-CHIP MICRO-COMPUTER HAVING A PLURALITY OF OPERATION MODES

This is a continuation of application Ser. No. 07/788,229 filed on Nov. 5, 1991 now abandoned.

BACKGROUND OF THE INVENTION

The present invention relates to a single-chip micro-computer and particularly relates to memory access signal terminals of such a micro-computer.

Conventional single-chip micro-computers output memory address signals to the outside through exclusively-used or private terminals therefor. Therefore, the terminals for memory address signals are exclusively used for controlling external memories. For example, in a system in which a keyboard is constituted by combining input terminals and output terminals in the form of a matrix, output terminals other than the memory address signal terminals are provided to be used for a key matrix.

This type single-chip micro-computer, however, requires a larger number of signal terminals as the storage capacity of the external memory increases. In particular, in the case where the single-chip micro-computer is used in an electronic memorandum book, an electronic dictionary, or the like, the number of terminals in an IC increases remarkably for the following reasons.

1) Large-capacity memory devices such as RAMs, ROMs and the like are connected externally, so that a large number of memory address signals, a large number of data input-output signals and a large number of control signals for reading, writing and the like are required.
2) There are many cases where a large-capacity liquid crystal display panel for dot matrix display or the like is used, so that a large number of liquid crystal driving terminals are required when a liquid crystal driving circuit is incorporated in the single-chip micro-computer. Specifically, even in the case where 24 characters of 5×7 dot matrix are displayed with a 1/16 duty factor, 76 terminals are required as the sum of 16 common terminals and 60 segment terminals.
3) It is general that a keyboard is used in the operation of the electronic memorandum book or the electronic dictionary, so that input terminals and output terminals are required for forming a key matrix.

When this type conventional single-chip micro-computer is applied to the aforementioned field, a very large number of terminals are required as described above. Therefore, a fine-pitch multi-pin package is required or a large chip size of the single-chip micro-computer is required. As a result, this type single-chip micro-computer becomes expensive. Further, the number of wirings in a substrate for mounting the single-chip micro-computer increases, so that mounting a fine-pitch IC package is required.. Therefore, a mounting technique of higher order is required. As a result, not only the IC but finished products become expensive.

SUMMARY OF THE INVENTION

The present invention seeks a solution for the above problem and, therefore, has as its object the provision of a single-chip micro-computer optimized for an electronic memorandum book, an electronic dictionary or the like by suppressing the increase of the number of terminals, and the provision of an electronic apparatus incorporating the single-chip micro-computer.

The single-chip micro-computer according to an aspect of the present invention comprises: an output register for storing a predetermined arithmetic operation output of an arithmetic logic operation unit; a mode setting register for establishing a mode setting signal for either a first mode for outputting a memory address signal or a second mode for outputting the arithmetic operation output stored in the output register; and a selection circuit for outputting either the memory address signal or the arithmetic operation output to address signal terminals on the basis of the mode setting signal. By setting a mode setting signal for either the first mode or the second mode in the mode setting register, the memory address signal or the predetermined arithmetic operation output from the arithmetic logic operation unit is suitably selectively taken out through the address signal terminals.

According to another aspect of the invention, in the single-chip micro-computer a matrix-like keyboard is connected to both the address signal terminals and the input terminals. When the mode setting signal for the second mode is set in the mode setting register, the predetermined arithmetic operation output stored in the output register is outputted through the address signal terminals. The keyboard is made operative by fetching the key input through the input terminals while scanning the keyboard on the basis of the arithmetic operation output.

According to a further aspect of the invention, the single-chip micro-computer further comprises an address decoder which receives the upper bits of the memory address signal and the mode setting signal and operates to activate selected one of an internal memory access signal and a chip selection signal so as to output the activated signal when the mode setting signal is set to the first mode while operates to make the chip selection signal inactive and at the same time to output a gate control signal for disabling external memory devices to receive any memory read signal and any memory write signal when the mode setting signal is set to the second mode.

Accordingly, when the mode setting signal is set to the first mode, the external memory devices are enabled to receive access. When the mode setting signal is set to the second mode, on the contrary, the external memory devices are disabled to receive access. The erroneous use of data appearing in the memory address terminals is prevented by distinguishing the two modes from each other. That is, because the data appearing in the memory address terminals is distinguished from the memory address signal when the mode setting signal is set to the second mode, erroneous operation can be prevented by disabling the external memory devices to receive access.

According to a still further aspect of the invention, the single-chip micro-computer further comprises: a first gate circuit which receives the memory read signal and the gate control signal and supplies its output signal to memory read signal terminals; and a second gate circuit which receives the memory write signal and the gate control signal and supplies its output signal to memory write signal terminals. Also in this aspect of the invention, when the mode setting signal is set to the second mode, both the memory read signal and the memory write signal are inhibited from appearing in the respective terminals so that the external memory devices are disabled to receive access.

According to another aspect of the invention, in the single-chip micro-computer, the mode setting means sets the first mode and the second mode alternately cyclically. Accordingly, access to the external memory devices and access to the keyboard are made in parallel.

According to a further aspect of the invention, in the single-chip micro-computer, provided on a single semiconductor substrate are: a program instruction memory means for storing a program instruction; an instruction memory means for temporarily storing the program instruction outputted from the program instruction memory means; a micro instruction generation circuit for sequentially outputting control signals on the basis of the program instruction temporarily stored in the instruction memory means; an arithmetic logic operation unit for performing an arithmetic logic operation of data on the basis of the control signals; a data temporary memory means for temporarily storing an output from the arithmetic logic operation unit on the basis of the control signals or for sending data to the arithmetic logic operation unit; an address setting means for setting the address of data stored in the data temporary memory means on the basis of an address setting signal; and the output register, the mode setting register, the selection circuits, the address decoder, the first gate circuit and the second gate circuit. According to this aspect of the invention, the output register is included in the data temporary memory means.

According to a further aspect of the invention, the electronic apparatus incorporates therein the aforementioned single-chip micro-computer in which the size of the apparatus is reduced by the reduction of the number of terminals in the single-chip micro-computer.

The above and other objects as well as advantageous features of the invention will become more clear from the following description taken in conjunction with the drawings.

BRIEF DESCRIPTION OF THE DRAWING

FIG. 1 is a block diagram showing the concept of a one-chip micro-computer as an embodiment of the present invention;

DESCRIPTION OF THE PREFERRED EMBODIMENTS

Figure 2:
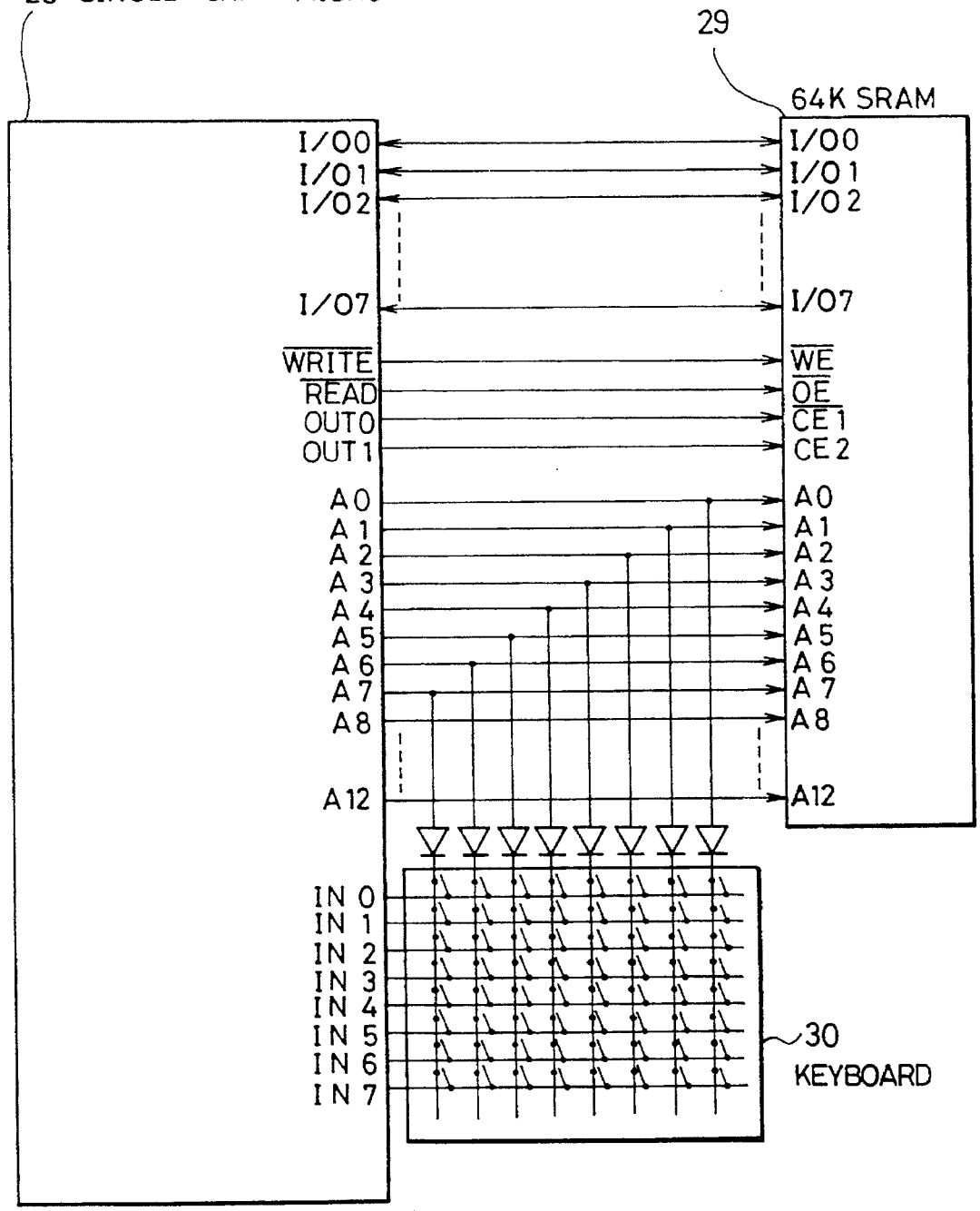
FIG. 2 is a wiring view showing an application of the one-chip micro-computer of FIG. 1.

FIG. 1 is a block diagram showing the basic structure of a single-chip micro-computer as an embodiment of the present invention. The basic operation sequence of the single-chip micro-computer is as follows.

A program instruction stored in a program instruction memory means 6 constituted by an ROM is fetched and written in an instruction register 7. The program instruction written in the instruction register 7 is decoded by an instruction decoder 8 to form a control signal as one of various kinds of micro instructions 9 to thereby control respective circuit blocks of the single-chip micro-computer. The instruction decoder 8 is constituted by a programmable logic array (PLA) or a micro ROM.

In the case where the program instruction is an arithmetic operation instruction, the data of an address designated by an address bus 14 is loaded into a temporary register 1 through a data bus 5 from a data memory means 10 constituted by an RAM and, at the same time, the data of an accumulator 4 is loaded into a temporary register 2 through the data bus 5. The data loaded into the two temporary registers 1 and 2 are subjected to an arithmetic operation in an arithmetic logic operation unit 3 and then fed back to the accumulator 4.

The address of the program memory means 6 is designated by a programmable counter 11. The address of the data memory means 10 is designated by an index register 12. Either the data of the programmable counter 11 or the data of the index register 12 to be output to the address bus 14 is selected by an address generation circuit 18 on the basis of the micro instruction and the timing.

Although the above description has been made on the case where the single-chip micro-computer has a very simple structure for simplification of explanation, it is a matter of course that the single-chip micro-computer practically has a plurality of data busses, a large number of registers such as registers for input ports, a large number of terminals such as input terminals, stack pointers, and the like.

In the following, the structure peculiar to this embodiment is described.

A mode setting register 16 is connected to the data bus 5, so that a mode setting signal "1" or "0" is set according to the program instruction. In the case where the mode setting signal 18 is "1", the address bus 14 is selected by selection circuits 19, 20 and 21 so that the memory address signal is output to output terminals 25, 26 and 27 through output drivers 22, 23 and 24.

In the case where the mode signal 18 is "0", the data bus 17 is selected by the selection circuits 19, 20 and 21 so that the data of the output register 15 is output to the output terminals 25, 26 and 27 through the output drivers 22, 23 and 24. A result of the predetermined arithmetic operation in the arithmetic logic operation unit 3 is registered in the output register 15, so that the data thereof is rewritten suitably according to the program instruction. Although this embodiment has shown the case where the output register 15 and the data memory means 10 are provided separately, the invention can be applied to the case where the output register 15 may be provided as a part of the data memory means 10.

FIG. 2 is a block diagram showing another embodiment of the invention as an example of application of the single-chip micro-computer shown in FIG. 1. In this embodiment, a static RAM 29 of 64 Kbits (8 Kbytes) and a keyboard 30 are connected to the single-chip micro-computer 28 of FIG. 1.

The single-chip micro-computer 28 and the static RAM 29 are connected to each other through data input-output terminals I/O0 –I/O7, a write control signal terminal/WE (/WRITE), a read control signal terminal /OE (/READ), chip selection signal terminals /CE1 (OUT0) and CE2 (OUT1), memory address signal terminals A0–A12, and so on. During access of the single-chip micro-computer 28 to the static RAM 29, the mode setting signal in FIG. 1 is "1", so that the memory address signal is outputted to the memory address signal terminals A0–A12 in FIG. 2. At this time, the chip selection signal is outputted from the single-chip micro-computer 28 to the static RAM 29 through the terminals /CE1 (OUT0) and CE2 (OUT1), so that the static RAM 29 is enabled to receive access. The aforementioned use condition is an ordinary use condition.

The keyboard 30 is constituted by a matrix connected both to the memory address signal terminals A0–A7 and to input terminals IN0–IN7. When the single-chip micro-computer 28 fetches the input data to the keyboard 30, the mode setting signal in FIG. 1 is set to "0". Then, data for key scanning are written in the output register 15 by the arithmetic logic operation unit 3 in FIG. 1, so that key data are sequentially read through the input terminals IN0–IN7 while scanning data outputted from the output register 15 to the memory address signal terminals A0–A7. Of course, at this time, the write control signal /WE (/WRITE), the read control signals/OE (/READ) and the chip selection signal/ CE1 (OUT0) and CE2 (OUT1) are non-active, so that the static RAM 29 is disabled from receiving access. The point will be described in detail with reference to the following embodiment.

In general application, the time of access to the external memory is short but the time of key depression by a man is sufficiently long in the viewpoint of the processing capacity of the single-chip micro-computer 28. Accordingly, the parallel processing of memory access and key process can be made without any practical problem by switching the mode setting signal to "1" or "0" cyclically.

Figure 3:
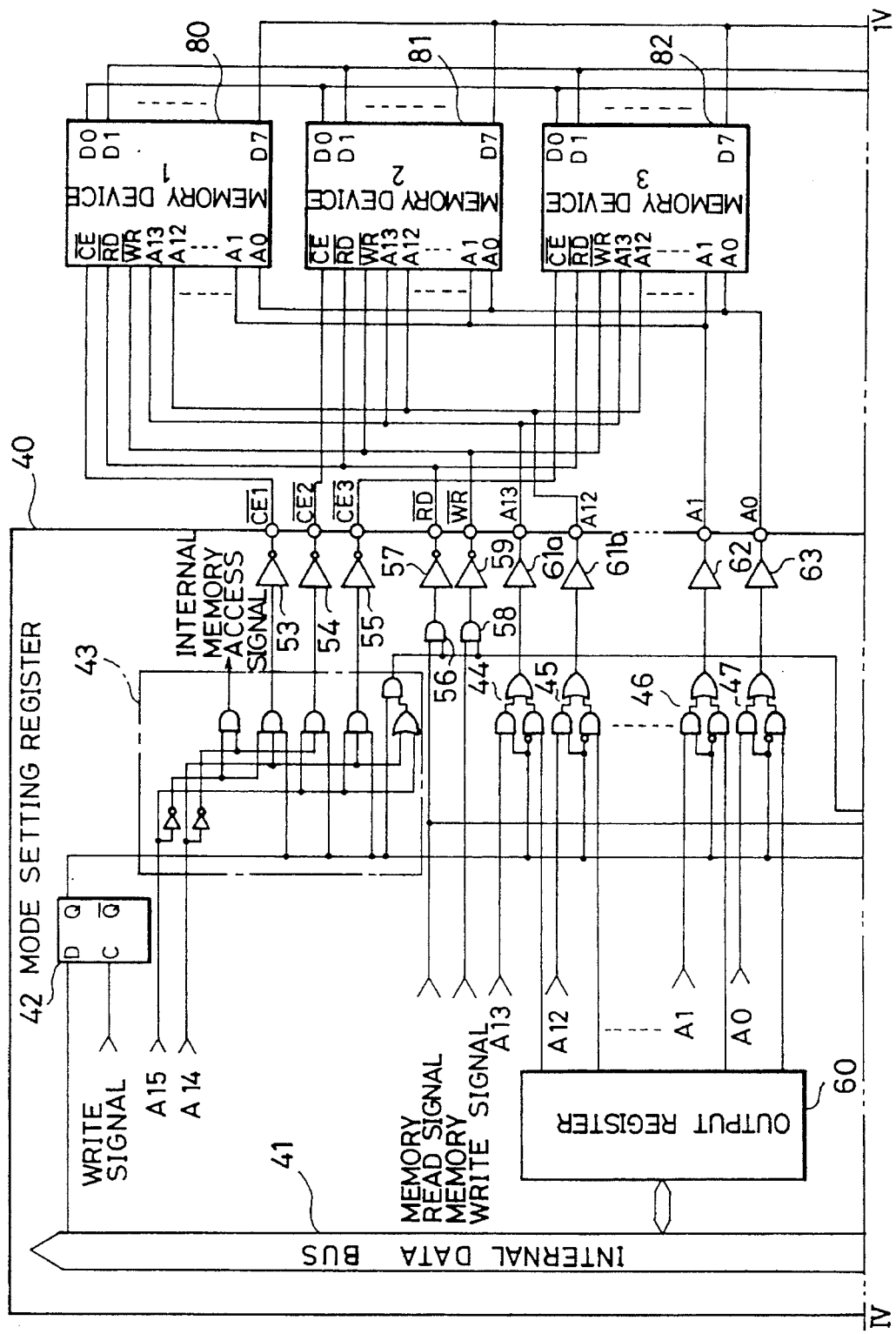
FIG. 3 is a block diagram showing a part of the circuit structure of the one-chip micro-computer as another embodiment of the invention.
Figure 4:
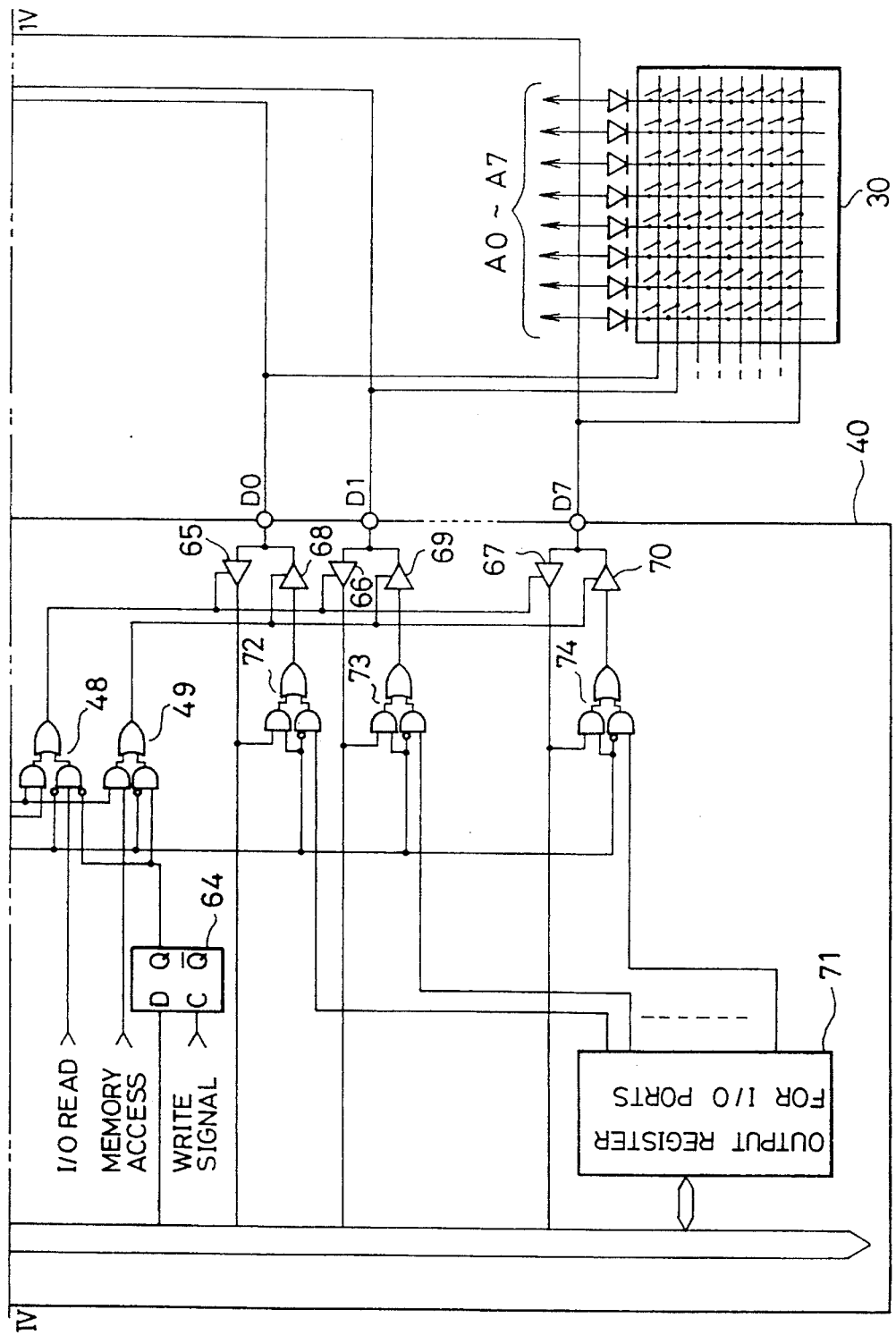
FIG. 4 is a block diagram showing the residual part of the circuit structure of the one-chip micro-computer in the embodiment of FIG. 3.

FIGS. 3 and 4 are block diagrams showing another example of the structure of the single-chip micro-computer.

A mode setting register 42 constituted by a d-type flip-flop circuit is connected to an internal data bus 41 of the single-chip micro-computer 40 through a control line. The mode setting signal is outputted from the mode setting register 40 to an address decoder 43 and selection circuits 44–47, 48, 49, 72–74. The address decoder 43 receives address signals A14 and A15 and the mode setting signal and outputs any one of an internal memory access signal and chip selection signals (/CE1), (/CE2) and (/CE3) to select a memory to receive access. When any one of the chip selection signals (/CE1), (/CE2) and (/CE3) is selected, the signal is transferred to a corresponding terminal through a driver 53, 54 or 55.

The memory read signal is sent to a corresponding terminal through an AND gate 56 having as its gate control signal an output signal from the address decoder 43 and a driver 57.

The memory write signal is sent to a corresponding terminal through an AND gate 58 having as its gate control signal an output signal from the address decoder 43 and a driver 59.

The output register 60 is connected to the internal data bus 41 through a control line, so that various kinds of data are written in the output register 60. The data written in the output register 60 are sent to selection circuits 44–47. The selection circuits 44–47 receive memory address signals A13-A0 as well as the data from the output register 60, so that either the memory address signals A13-A0 or the data from the output register 60 are selected on the basis of the mode setting signal set in the mode setting register 42 according to the macro instruction so as to be output to the outside through the drivers 61a, 61b, 62 and 63 respectively.

An input-output changeover register 64 constituted by a d-type flip-flop circuit is connected to the internal data bus 41 through a control line. When, for example, the changeover signal of the input-output changeover register 64 is "1", the input-output ports are set to an output mode. When, for example, the changeover signal is "0", the input-output ports are set to an input mode. The changeover signal of the input-output changeover register 64 is supplied, together with the mode setting signal and the I/O read signal, to a selection circuit 48, and supplied, together with the mode setting signal and the memory access signal, to a selection circuit 49. The selection circuit 48 controls input buffers 65–67 by its output, and the selection circuit 49 controls output buffers 68–70 by its output. The input buffer 65 and the output buffer 68 are connected to one data terminal, so that these buffers form a two-way buffer. The other input buffers and the other output buffers respectively form two-way buffers in the same manner as described above.

An output register 71 for I/O ports is connected to the internal data bus through a control line, so that various kinds of data are written in the output register 71. The data written in the output register 71 are supplied to selection circuits 72–74. The selection circuits 72–74 receives the outputs from the input buffers 65–67 and the mode setting signal as well as the data of the output register 71 for I/O ports and supplies the data of the output register 71 for I/O ports to the output buffers 68–70 while suitably selecting one. In this embodiment, the minimum of a structure required for description is shown but the others are not shown.

As shown in the drawings, three static RAMs 80, 81 and 82 are connected to the single-chip micro-computer 40 and, further, the same keyboard 30 as in the embodiment of FIG. 2 is connected thereto.

In the following, the operation of the single-chip micro-computer is described. It is now assumed that the mode setting register 42 is set to "1". In this case, the microcomputer operates as an external memory access mode. In this embodiment, the CPU has an address space of 64 Kbytes (16 bit address) which is separated into four address groups of 16 Kbytes. This address space is shown in the following table.

[TABLE 1]

| | A15 | A14 | A13 | A12 | ... | A1 | A0 | Corresponding Memory |
|---|---|---|---|---|---|---|---|---|
| 16 K | 0 | 0 | 0 | 0 | ... | 0 | 0 | Internal Memory |
| | 0 | 0 | 1 | 1 | ... | 1 | 1 | |
| 16 K | 0 | 1 | 0 | 0 | ... | 0 | 0 | External Memory |
| | 1 | 1 | 1 | 1 | ... | 1 | 1 | Device 1 |
| 16 K | 1 | 0 | 0 | 0 | ... | 0 | 0 | External Memory |
| | 1 | 0 | 1 | 1 | ... | 1 | 1 | Device 2 |
| 16 K | 1 | 1 | 0 | 0 | ... | 0 | 0 | External Memory |
| | 1 | 1 | 1 | 1 | ... | 1 | 1 | Device 3 |

As shown in Table 1, the address space is classified into four address groups, so that any one of the internal memory access signal and the chip selection signals/CE1, /CE2 and/CE3 is made active by the address decoder 43. The case where any one of the internal memory access signal and the chip selection signals /CE1, /CE2 and /CE3 is made active occurs only when the mode setting signal is "1". When any one of the internal memory access signal and the chip selection signals /CE1, /CE2 and/CE3 is made active, the memory read signal or the memory write signal from the CPU is supplied to a corresponding/RD or/WR terminal through an AND gate 56 or 58 and an output buffer 57 or 59 to read data from one of the static RAMs 80–82 or write data in one of the static RAMs 80–82.

When data are to be read from the static RAMs 80–82, the input changeover register is set to "0" to operate the selection circuit 48 to make the input buffers 65–67 active so that data from the static RAMs 80–82 are fetched through the internal data bus 41 on the basis of the address signals A0–A12.

When data are to be written in the static RAMs 80–82, the input register is set to "1" to operate the selection circuit 48 to make the output buffers 68–70 active so that the data of the output register 71 for I/O ports are supplied to the output buffers 68–70 through the selection circuits 72–74 and written in the corresponding address of the static RAMs 80–82 on the basis of the memory address signals A0–A13.

Figure 5:
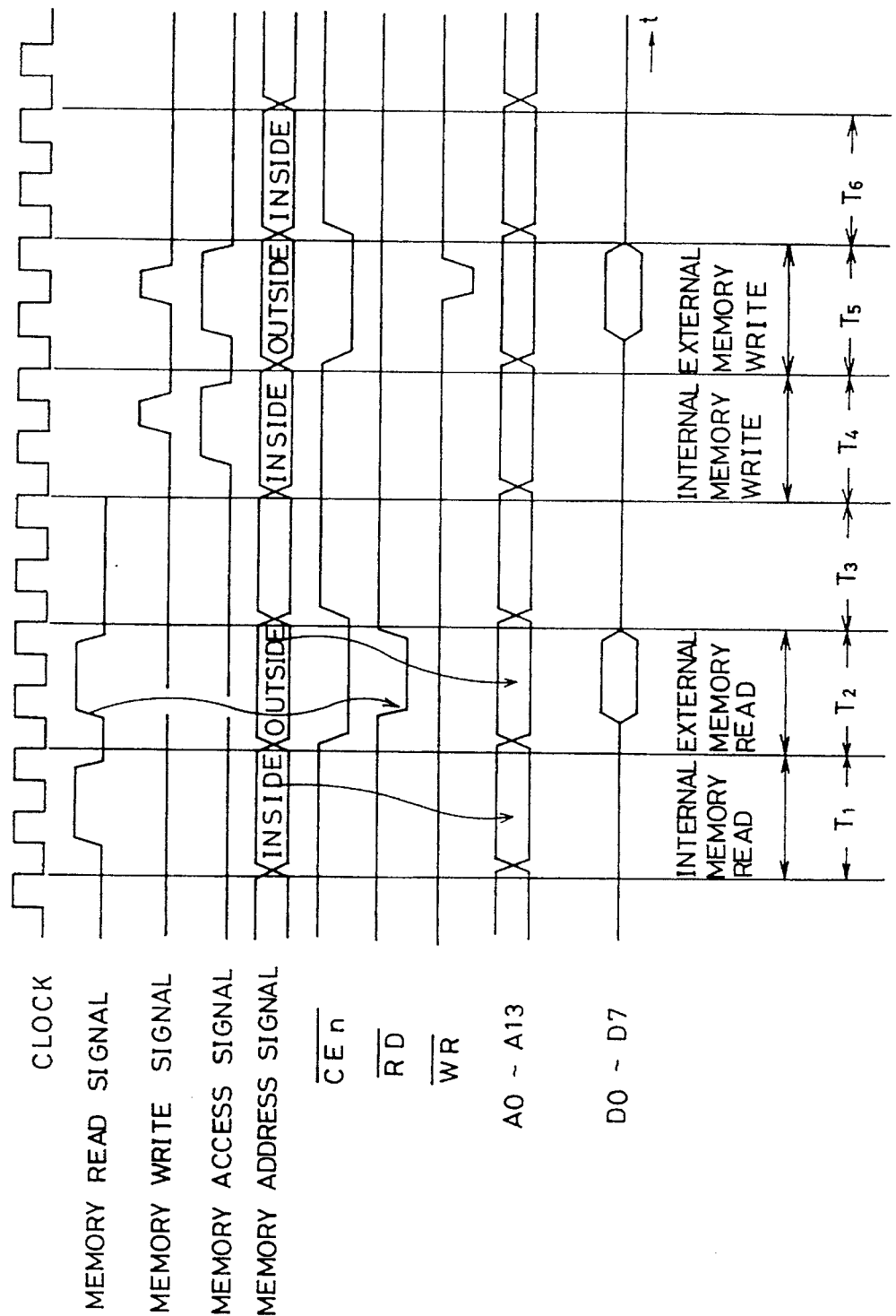
FIG. 5 is a timing chart showing the operation of the one-chip micro-computer depicted in FIGS. 3 and 4.

FIG. 5 is a timing chart showing the aforementioned operation. In FIG. 5, one machine cycle is constituted by two clock pulses. The cycle T1 shows the case where the memory address signal expresses an address of the internal memory (not shown). In the cycle T1, an internal memory address signal from the address decoder 43 and a memory read signal are output so that data are read from the corresponding internal memory on the basis of the memory address signals A0–A13. In the cycle T2, a memory read signal and a chip selection signal /CEn are outputted so that data are read from a corresponding one of the static RAMs 80–81 on the basis of the memory address signals A0–A13 and fetched in the CPU through the output terminals D0–D7. In the cycle T4, a memory write signal, a memory access signal and an internal memory access signal are outputted so that data from the CPU are written in the internal memory on the basis of the address signals A0–A13. As shown in the drawing, the memory access signal is output in such timing that a part of the waveform thereof overlaps the memory write signal. In the cycle T5, a memory write signal, a memory access signal and a chip selection signal/CEn are output so that data are output from the output register 71 for I/O ports through the output terminals D0–D7 and written in an address of a corresponding one of the static RAMs 80–81 designated by the memory address signals A0–A13.

In the following, the case where the mode setting register 42 is set to "0" is described.

When the mode setting register 42 is set to "0", all the chip selection signals /CE1–/CE3, the memory read signal/ RD and the memory write signal /WR turn to high-level signals as non-active signals to disable the static RAMs 80–82 from receiving access. The data of the output register 60 is selected by the selection circuits 44–47, so that the data appears in the memory address signal terminals A7–A0. The data is supplied as a scanning signal for the keyboard 30. At this time, the input-output changeover register 65 is set to "0", so that the key input from the keyboard 30 is fetched into the CPU through the input buffers 65–67 and the internal data bus 41.

Figure 6:
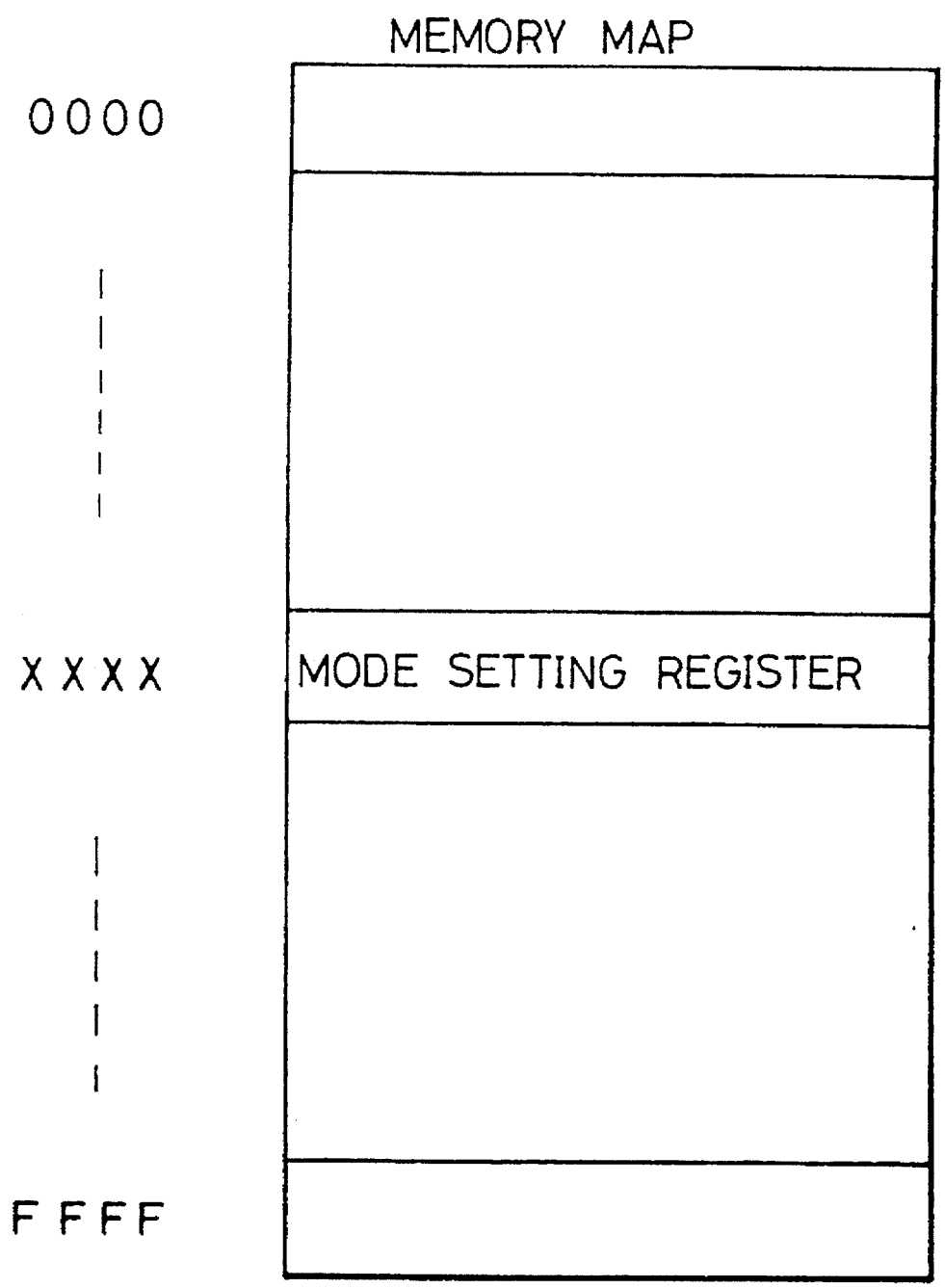
FIG. 6 is an explanatory view of a memory map.

The mode setting register 42 is constituted by a peripheral circuit made of a memory map I/O. Accordingly, the write signal is constituted by a signal obtained by the AND logic of a register selection signal and a write signal in the inside of the CPU. That is, assuming now that the address of the mode setting register 42 is set to XXXX as shown in FIG. 6, then a register selection signal for the mode setting register 42 is generated by decoding at the time of access to the address XXXX to thereby select the mode setting register 42 and, at the same time, a desired value is written in the mode setting register 42 by execution of a program in such timing that a write signal is generated. In the case shown in FIGS. 3 and 4, if the mode setting register 42 is set to "0", the data of the output register 60 is outputted to A0–A13. When the mode setting register is rewritten to "1" by execution of the program, the function of A0–A13 is changed over to the address output. Because the mode setting register 42 is made of memory mapped I/O, the register can be rewritten easily by a memory operation instruction.

For example, in application of an electronic telephone directory, when an electric source for the electronic telephone directory is switched on, the electronic telephone directory stands by for acceptance of key input so that the mode setting register 42 is set to "0" to output the key-scanning output data, that is, the data of the output register 60, to A0–A7.

When a key is inputted, a key input process is carried out by a program. When, for example, the inputting of a person's name is finished, the program enters into a process of searching for a telephone number corresponding to the person's name. At this time, the mode setting register must be rewritten to "1" to make access to an external memory in which the telephone number is stored. After the mode setting register 42 is rewritten to "1", the external memory is enabled to receive access so that a registration process, a sorting process or the like can be carried out as well as the data searching process. It is impossible to accept any input data from the keyboard during the process, but there is no missing of accepting the input data, generally, as long as the key input by hand can be sampled once in a period of 30 msec to 50 msec. Accordingly, even in the case where external memory data are processed, the process can be continued without missing of any key input by turning the mode setting register to "0" once in a period of 30 msec to 50 msec for carrying out the key input process. Such sampling and key processes can be provided easily by using a timer interrupt function which is generally incorporated in the single-chip micro-computer.

Figure 7:
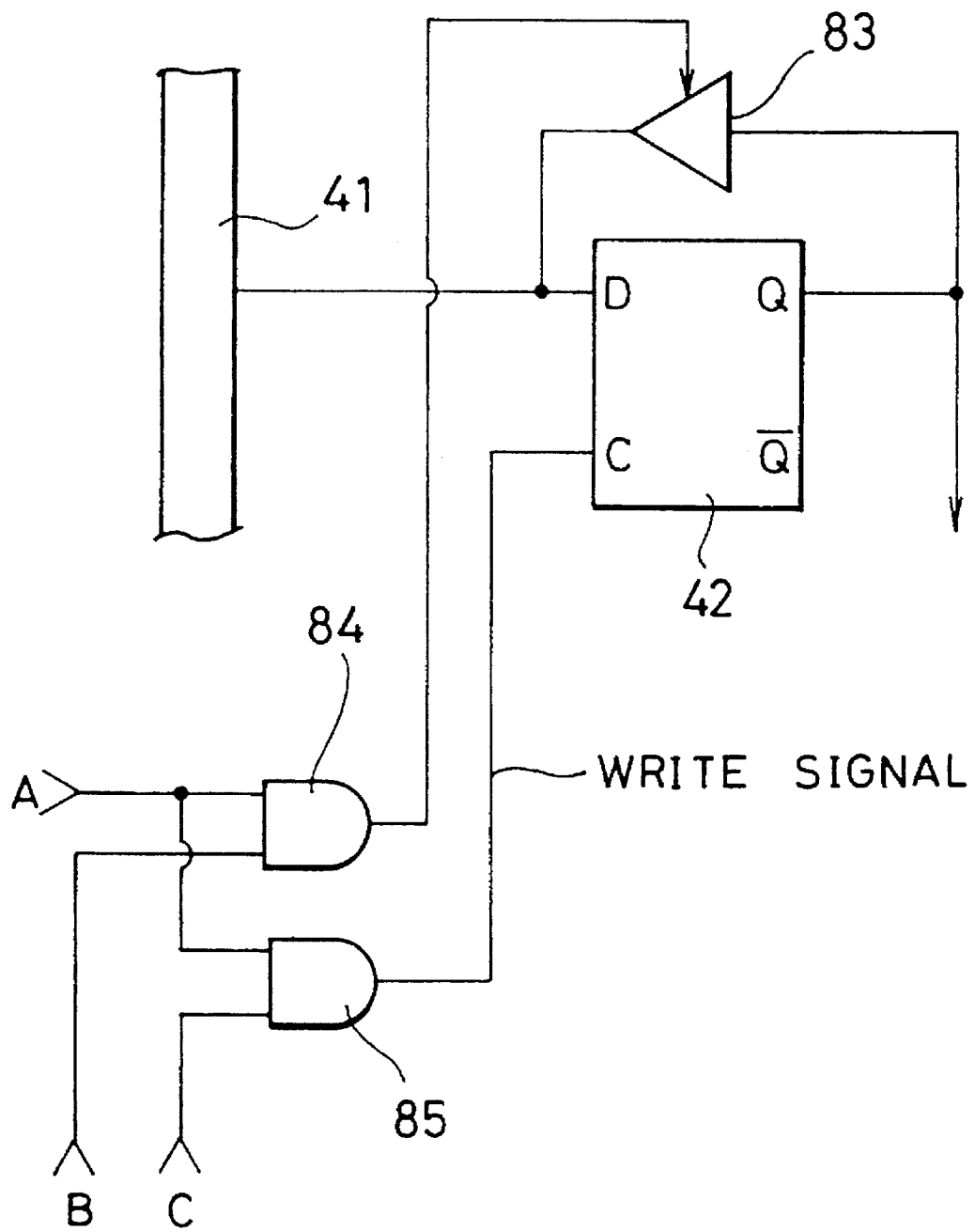
FIG. 7 is a circuit diagram in the case where the CPU need read the data of the mode setting register 42.

In the case where the CPU needs to read the data of the mode setting register 42, the data can be read out to the internal data bus 41 through a tri-state buffer 83 as shown in FIG. 7. In this case, the data of the mode setting register 42 is read out by calculating the AND operation of the address selection signal A and the read signal B in the inside of the CPU through an AND circuit 84 and then driving the tri-state buffer 83 on the basis of the AND operation. In the case where a data must be written in the mode setting register 42 in the embodiment of FIG. 7, a desired value can be written in the mode setting register 42 by calculating the AND operation of the register selection signal A and the write signal C in the inside of the CPU through the AND circuit 84 and then executing the program in such timing that the AND operation is outputted as a write signal to the mode setting register 42. Though not shown in FIGS. 3 and 4, this writing process can be applied also to the embodiment shown in FIGS. 3 and 4.

Although the aforementioned embodiment has shown the case where the keyboard 30 is connected both to the memory address signal terminals A7-A0 and to the output terminals D7-D0, the invention can be applied to the case where a liquid crystal display may be connected. In this case, data are outputted through the output terminals D7-D0.

Figure 8:
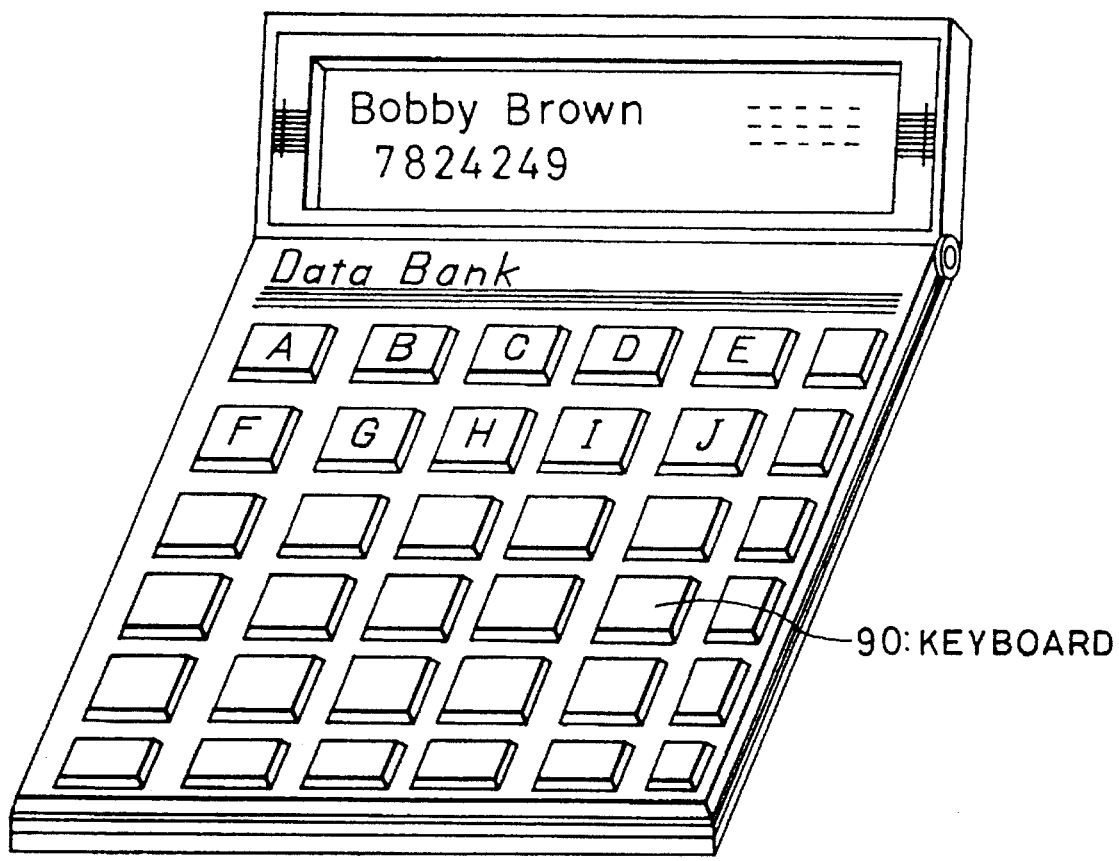
FIG. 8 is a perspective view of an electronic memorandum book incorporating the aforementioned one-chip micro-computer.

FIG. 8 is a perspective view of an electronic memorandum book incorporating the aforementioned one-chip micro-computer. In FIG. 8, the keyboard 90 has the same structure as that of the keyboard 30 shown in FIG. 1 or FIG. 4.

It is apparent from the above description that because the terminals according to the present invention serve as address signal terminals and serve also as data output terminals, the number of the output terminals in the single-chip micro-computer applied to an electronic memorandum book, an electronic dictionary or the like can be reduced to attain the reduction in cost of an IC as well as in cost of a finished product in which the IC is mounted. Although the embodiment of FIG. 1 has shown the case where eight output terminals can be saved, the effect of the invention will be more remarkable when the invention is applied to the case where a larger number of keys are required. Even in the case where the keyboard is replaced by another IC such as a dialer IC, output terminals which have been used heretofore only as address output terminals can be used for controlling the IC such as a dialer IC. Accordingly, the effect of the invention will be more remarkable when the invention is applied to a more complicated system structure.

The number of pins in an IC package generally gradually changes to 80 pins, 100 pins, 128 pins, 144 pins and 160 pins. As the number of pins increases, both the body size and the cost increase. The total number of terminals is reduced by applying the present invention. Accordingly, in the case where the specification of the package is satisfied by a package having a number of pins being one grade lower, not only the chip cost but the package cost can be reduced. In the case where the body size of the package is reduced, reduction in size and thickness of finished products can be attained. Accordingly, the invention is particularly effective for an electronic memorandum book, an electronic dictionary and the like.

What is claimed is:

1. A single-chip micro-computer comprising:
   an output register for storing an arithmetic operation output and for outputting the arithmetic operation output to an outer terminal;
   an address generating circuit for outputting a memory address signal to the outer terminal;
   a program instruction memory means for storing and outputting program instructions;
   a mode setting register for setting one of first and second mode setting signals on the basis of the output program instructions of the program instruction memory means; and
   a selection circuit for selecting the memory address signal output to the outer terminal when the one of the mode setting signal from said mode setting register is the first mode setting signal and for selecting the arithmetic operation output to the outer terminal when the one of the mode setting signals from the mode setting register is the second mode setting signal.

2. A single-chip micro-computer according to claim 1 further comprising a chip-selection signal outputting terminal for outputting chip-selection signals for controlling activating/inactivating state of outer memory means,
   whereby said chip-selection outputting terminal sends signals making the outer memory means activating when said mode setting signal is in the first mode; and
   whereby said chip-selection outputting terminal sends signals making the outer memory means inactivating when said mode setting signal is in the second mode.

3. A single-chip micro-computer according to claim 1 further comprising:
   a plurality of chip selection signal outputting terminals for outputting chip-selection signals for controlling activating/inactivating state of a plurality of outer memory means;
   an address decoder for receiving address signals to select activating/inactivating state of said plurality of outer memory means and said mode setting signals;
   wherein said address decoder enables said chip-selection signal based on said address signal activating, when said mode setting signal is set to the first mode; and
   wherein said address decoder outputs chip-selection signals for making said outer memory means inactivating from all of said chip-selection outputting terminals, when said mode setting signal is set to said second mode.

4. A single-chip micro-computer according to claim 1 further comprising:
   a writing signal outputting terminal for outputting a writing signal controlling writing-in possible/ impossible state;
   whereby a writing-in signal makes a writing-in possible when said mode-setting signal is set to the first mode.

5. A single-chip micro-computer according to claim 1 comprising:
   a readout signal outputting terminal for outputting readout signal controlling readout possible/impossible state;
   whereby a readout signal makes a reading-out possible when said mode-setting signal is set to the first mode.

6. An electronic apparatus according to claim 1 further comprising a matrix like keyboard to be connected to said output terminal.

7. An electronic apparatus according to claim 6 wherein said output terminal is the terminal for key-scanning said keyboard, and further comprising an input terminal for inputting an output signal from said keyboard.

8. A single-chip micro-computer comprising:
   an output register member for storing an arithmetic operation output and for outputting the same to an outer terminal;
   an address generating circuit for outputting a memory address signal to said outer terminal;
   a mode setting register for setting cyclically a plurality of mode setting signals; and
   a selection circuit for selecting a signal outputted from said outer terminal as said memory address signal when a mode setting signal of said mode setting register is set to the first mode, and for selecting a signal outputted from said outer terminal as said arithmetic operation output when said mode setting signal is set to the second mode.

9. An electronic apparatus comprising:
   an output register member for storing an arithmetic operation output and for outputting the same to an output terminal;
   program instruction memory means for storing and outputting program instructions;
   a mode setting register for setting a plurality of modes on the basis of the program instructions from said program instruction memory means; and
   a selection circuit for selecting a signal outputted from said output terminal as said memory address signal when said mode setting signal is set to the first mode, and for setting a signal outputted from said outer terminal as said arithmetic operation output when said mode setting signal is set to the second mode.

* * * * *